(No Model.)
E. HOY.
POTATO DIGGER.
No. 346,918. Patented Aug. 10, 1886.
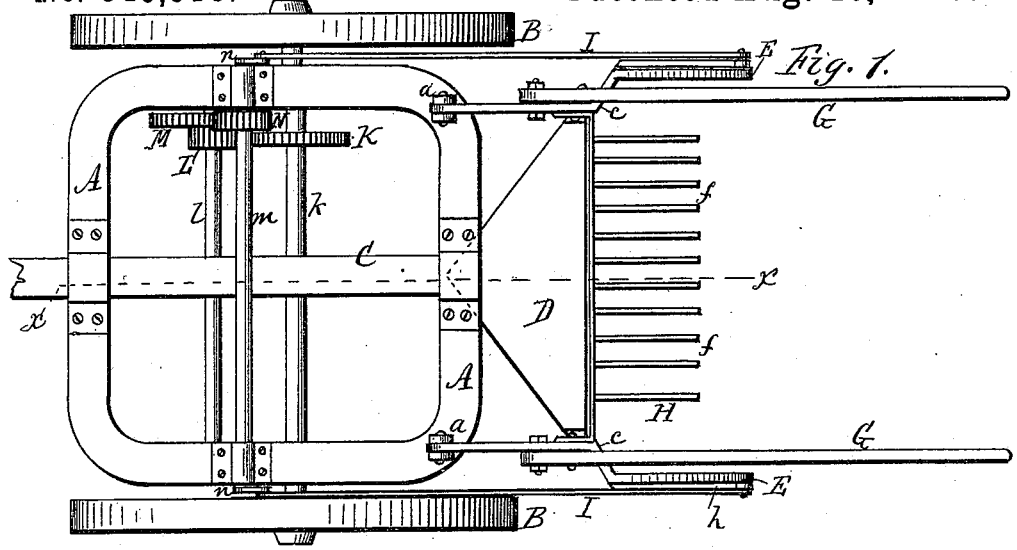
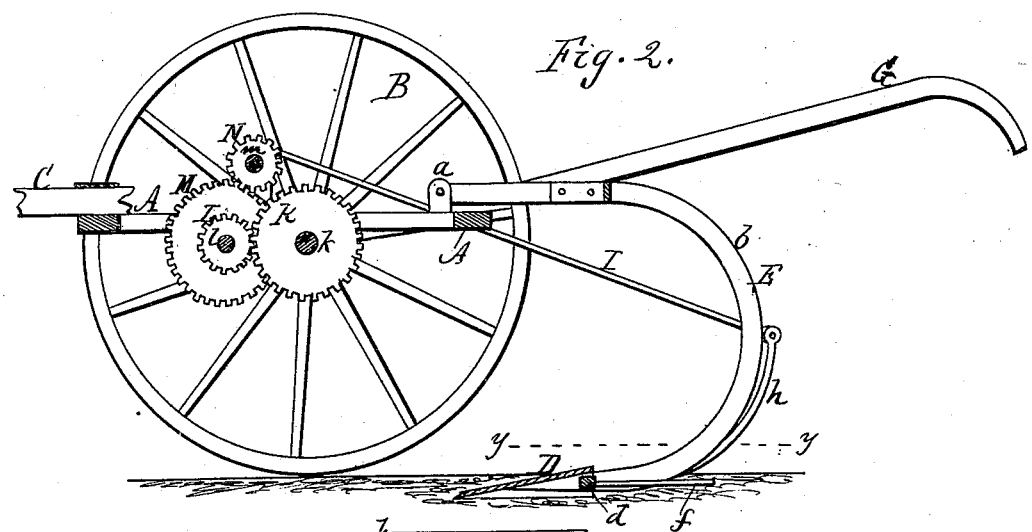
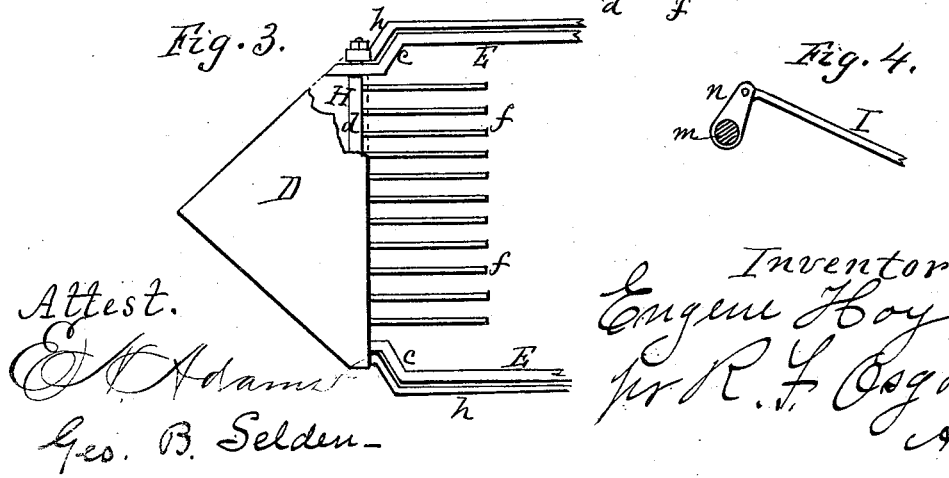
Attest.
E. N. Adams
Geo. B. Selden
Inventor.
Eugene Hoy,
per R. F. Osgood,
Atty.

UNITED STATES PATENT OFFICE.

EUGENE HOY, OF SPENCERPORT, NEW YORK.

POTATO-DIGGER.

SPECIFICATION forming part of Letters Patent No. 346,918, dated August 10, 1886.

Application filed May 13, 1886. Serial No. 202,116. (No model.)

*To all whom it may concern:*

Be it known that I, EUGENE HOY, of Spencerport, in the county of Monroe and State of New York, have invented a certain new and useful Improvement in Potato-Diggers; and I do hereby declare that the following is a full, clear, and exact description of the same, reference being had to the drawings accompanying this application.

My improvement relates to that class of potato-diggers in which a scoop is used which runs under the potatoes, and an agitator is hung to the rear of the scoop and vibrates up and down to loosen the potatoes and raise them from the soil. Such devices are known.

The invention consists in the special construction and arrangement of the machine, as hereinafter more fully described and definitely claimed.

In the drawings, Figure 1 is a plan view of the machine. Fig. 2 is a longitudinal vertical section of same in line $xx$ of Fig. 1. Fig. 3 is a plan view of the scoop and agitator, looking downward from line $yy$ of Fig. 2. Fig. 4 is a detail view.

In the drawings, A indicates a square frame, preferably made of iron. B B are driving-wheels, on which the frame is mounted. C is the tongue or pole by which the machine is drawn.

My improvement is as follows: D is the scoop which passes under the potatoes and raises them from the soil. It consists of a flat triangular plate set in an inclined position, the front end being pointed to enter the soil loosely.

E E are two side pieces, forming the frame of the scoop, the same consisting of bars of strap-iron bent in proper form. The upper front ends of these bars are pivoted to bearings $a\ a$, firmly attached to the main frame A, and arranged so that the side bars can turn up and down. From this point of attachment down to the scoop the side bars, E E, are carried backward in curved form a considerable distance behind the scoop, as shown at $b$, for the purpose of allowing proper clearance of the dirt and vines from the sides as well as the rear of the scoop, as will be more fully described. The lower ends of the side bars are bolted or otherwise attached on the under side of the scoop, and, being beveled, they set the scoop at the proper angle to pass under the potatoes. Just in the rear of the scoop also the side bars, E E, are offset outward to a greater distance apart, as shown at $cc$, Fig. 3, the object of which is to enable the dirt to fall over behind from the scoop without being impeded by the said bars, and also to allow the agitator, hereinafter described, to have ample room to receive such dirt when it falls over.

G G are handles attached to the side bars, E E, and extending backward in convenient position to be operated by hand.

H is the agitator, consisting of a cross-bar, $d$, having journals that pass through and extend beyond the ends of the side bars, E E, and a set of teeth, $ff$, attached to the cross-bar, and extending back from the scoop and dragging in the ground. To the ends of the journals of the cross-bar, outside the ends of the side bars, are attached stiff crank-arms $h\ h$, which extend back, following the curve of the side bars, before described, so as not to interfere with the clearance of the dirt and vines sidewise, and then extending up half-way (more or less) of the height of the curve of the side bars, as shown in Fig. 2.

I I are two connecting-rods, pivoted at the rear ends to the tops of the crank-arms $h\ h$, and connecting at their front ends with the driving mechanism by the following means:

K is a spur-gear, attached fast to the axle $k$ of the driving-wheels and revolving with it.

L is a pinion fast on another shaft, $l$, and engaging with the gear K.

M is a spur-wheel on shaft $l$, and N is a pinion on a third shaft, $m$, with which M engages. On each end of the shaft $m$ is a short crank, $n$, to which the connecting-rod I on that side is attached at the front end.

As the machine moves forward motion is imparted by the driving-wheels to the gearing, and the cranks $nn$ are turned, giving reciprocating motion to the connecting-rods I I, which in turn vibrate the agitator H and cause its teeth to move alternately up and down and raise the potatoes from the soil and deposit them in the rear free of dirt.

I disclaim simply and broadly a scoop and agitator in a potato-digger, as they are well known. The great difficulty in such devices has been that provision has not been made for the clearance of the dirt and vines, which, gathering in the contracted space at the sides and between the scoop, have clogged the machine, especially where the ground is heavy or the vines are green and thick. I obviate this difficulty, first, by making a long backward curve to the side bars of the scoop, and, second, and most important, by offsetting said side bars just back of the scoop, as shown at *c c*, so as to make a wide space between them, and also by carrying the crank-arms *h h* back, offset and curved in the same manner as before described. By this means there is free discharge of vines and dirt, not only in the rear of the scoop, but also at the sides, so that the vines cannot collect and clog the machine.

Having described my invention, what I claim as new, and desire to secure by Letters Patent, is—

1. In a potato-digger, the combination, with the scoop D and agitator H, of the side bars, E E, attached to the scoop in the rear and offset from the sides and lying in line, as shown and described, and for the purpose specified.

2. In a potato-digger, the combination of the scoop, the agitator, the side bars attached to the scoop, and the crank-arms attached to the agitator, the side bars and crank-arms being curved backward from the scoop in the rear and offset at the sides, and the connecting-rods attached at one end to the crank-arms and at the other to cranks operated by gearing on the main frame, as herein shown and described.

3. In a potato-digger, the combination of the main frame mounted on driving-wheels, the side bars pivoted to the main frame, curved backward at the rear, and offset at the sides, the scoop attached to the side bars, the agitator pivoted to the side bars at the rear of the scoop, the crank-arms attached to the agitator, and connecting-rods attached at one end to the crank-arms and at the other to cranks operated by gearing on the main frame, as set forth.

In witness whereof I have hereunto signed my name in the presence of two subscribing witnesses.

EUGENE HOY.

Witnesses:
   M. McDERMOTT,
   JACOB SPAHN.